(12) United States Patent
Naitou et al.

(10) Patent No.: US 7,753,632 B2
(45) Date of Patent: Jul. 13, 2010

(54) FASTENING DEVICE

(75) Inventors: Tadashi Naitou, Utsunomiya (JP); Yuta Urushiyama, Utsunomiya (JP); Shunji Suzuki, Utsunomiya (JP); Katsuaki Taguchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 919 days.

(21) Appl. No.: 11/547,563

(22) PCT Filed: Apr. 5, 2005

(86) PCT No.: PCT/JP2005/006656

§ 371 (c)(1),
(2), (4) Date: Oct. 5, 2006

(87) PCT Pub. No.: WO2005/098245

PCT Pub. Date: Oct. 20, 2005

(65) Prior Publication Data

US 2007/0212189 A1    Sep. 13, 2007

(30) Foreign Application Priority Data

Apr. 7, 2004    (JP) .............................. 2004-113231

(51) Int. Cl.
*E01B 9/12*    (2006.01)

(52) U.S. Cl. ................ 411/511; 411/390; 411/DIG. 2; 411/512; 411/521; 411/522

(58) Field of Classification Search ................ 411/390, 411/511, 512, 521, 522, DIG. 2; 248/49, 248/65, 75; 294/903; 403/52; 24/602–603
See application file for complete search history.

(56) References Cited

U.S. PATENT DOCUMENTS

| 1,926,925 | A | * | 9/1933 | Wescott ...................... 403/296 |
| 3,408,890 | A | * | 11/1968 | Bochman, Jr. .............. 411/391 |
| 3,454,286 | A | * | 7/1969 | Anderson et al. .......... 285/21.1 |
| 3,546,996 | A | * | 12/1970 | Grijalva et al. .............. 411/390 |
| 3,613,732 | A | * | 10/1971 | Willson et al. ......... 137/625.44 |
| 3,725,835 | A | * | 4/1973 | Hopkins et al. ............. 337/140 |
| 4,096,993 | A | * | 6/1978 | Behr ......................... 236/68 B |
| 5,119,555 | A | * | 6/1992 | Johnson ....................... 29/254 |
| 5,129,753 | A | * | 7/1992 | Wesley et al. ............. 403/322.3 |
| 5,144,813 | A | * | 9/1992 | Orner et al. ................... 62/187 |
| 5,722,709 | A | * | 3/1998 | Lortz et al. ................. 294/86.4 |
| 6,450,725 | B1 | | 9/2002 | Roth et al. |
| 2001/0026687 | A1 | | 10/2001 | Kosaka et al. |

FOREIGN PATENT DOCUMENTS

DE    198 43 965 A1    4/2000

(Continued)

*Primary Examiner*—Victor Batson
*Assistant Examiner*—Roberta Delisle
(74) *Attorney, Agent, or Firm*—Arent Fox LLP

(57) ABSTRACT

A fastening device includes a fastening member that fixedly fastens fastened members, and a driving member that is capable of releasing a fastening state of the fastening member by applying a driving force to a moving portion provided in the fastening member to drive it, wherein the driving member is formed of a shape memory alloy, and the driving force is a restoring force of the shape memory alloy to its memory shape.

8 Claims, 9 Drawing Sheets

FOREIGN PATENT DOCUMENTS

| | | |
|---|---|---|
| EP | 0 102 180 A | 3/1984 |
| JP | 55-179216 U | 12/1980 |
| JP | 3-167448 | 7/1991 |
| JP | 05-005236 U | 1/1993 |
| JP | 2000-127927 A | 5/2000 |
| JP | 2001-263221 A | 9/2001 |
| JP | 2001-268956 A | 9/2001 |
| JP | 2002-005124 A | 1/2002 |
| JP | 2003-285862 A | 10/2003 |
| JP | 2003-301815 A | 10/2003 |

\* cited by examiner

WHEN FASTENED

WHEN RELEASED

WHEN FASTENED

WHEN RELEASED

WHEN FASTENED

WHEN RELEASED

FASTENING DEVICE

TECHNICAL FIELD

The present invention relates to a fastening device.

Priority is claimed on Japanese Patent Application No. 2004-113231, filed Apr. 7, 2004, the content of which is incorporated herein by reference.

BACKGROUND ART

There is conventionally known a joint retaining member in which among a shaft, a header that fits on one end of the shaft and a nut that fits on the other end of the shaft, at least any one of the members is formed of a shape memory alloy, so that the joint retaining member can release the mechanical binding by shape change of the shape memory alloy in accordance with heating or cooling applied to this member (for example, refer to Patent Document 1).

Also, there is conventionally known a fastening member that is formed of a shape memory alloy molded in such a shape that fastening can be released under heating, in which the fastening member is secondarily processed into a shape capable of fastening at temperatures at which it is not reverted to the memorized shape, and a microwave absorption material or infrared absorption material is coated on the surface of the fastening member or provided inside the fastening member (for example, refer to Patent Document 2).

Patent Document 1: Japanese Unexamined Patent Application, First Publication No. 2002-5124

Patent Document 2: Japanese Unexamined Patent Application, First Publication No. 2003-301815

DISCLOSURE OF THE INVENTION

Problems to be Solved by the Invention

However, in the joint retaining member or the fastening member according to the aforementioned prior art, since the main body of the joint retaining member or the fastening member is formed of a shape memory alloy and has a relatively complicated shape, improving the efficiency of heat transfer during heating is difficult, and problems arise such as accumulation of the energy required until releasing the mechanical binding and fastening. Also, since the joint retention strength and fastening strength are restricted according to the material characteristics of the shape memory alloy, there is a risk that the desired strength cannot be ensured.

The present invention was achieved in view of the aforementioned circumstances, and has as its object to provide a fastening device that can reduce the energy required for fastening release and readily release the fastening, and can ensure the desired fastening strength.

Means for Solving the Problem

In order to solve the aforementioned problems to attain the object, the fastening device according to the present invention is provided with a fastening member that fixedly fastens fastened members, and a driving member that is capable of releasing a fastening state of the fastening member by applying a driving force to a moving portion provided in the fastening member to drive it, wherein the driving member is formed of a shape memory alloy, and the driving force is a restoring force of the shape memory alloy to its memory shape.

According to the fastening device of this constitution, providing the fastening device with the fastening member and the driving member can prevent the shapes of the members from becoming complicated compared to the case of, for example, integrating the fastening member and the driving member, and can improve the versatility of the fastening device. Also, by forming the driving member, which is capable of releasing the fastening state of the fastening member, with a shape memory alloy, the fastening member may be formed of a suitable construction material that can ensure the desired fastening strength so that the fastened members can be fixedly fastened in a suitable manner.

In the fastening device according to the present invention, presupposing the aforementioned invention, is provided with an energizing means that energizes the driving member, wherein the driving member is reverted to the memory shape by being energized by the energizing means.

According to the fastening device of this constitution, the driving member, which is formed of a shape memory alloy, is restored from a deformed state to the memory shape when the temperature rises to the transformation point of the shape memory alloy or higher by resistance heat generation from energization from the energizing means, with the moving portion being driven by the restoring force at this time to release the fastening state of the fastening member.

In the fastening device according to the present invention, presupposing the aforementioned invention, the fastening member is provided with a pin member that is attached to the fastened members, and a clip member that holds the pin member, the clip member includes two pinching members formed as the moving portion to be turnable about a turning axis, with the pin member being held so as to be pinched from both sides by the two pinching members, and the driving member releases the fastening state of the fastening member by turning the pinching members of the clip member about the turning axis.

According to the fastening device of this constitution, the fastened members to which the pin member is attached are fixedly fastened by the clip member that pinches the pin member and a nut member that is attached to one end of the pin member. The driving member releases the pinched state of the pin member by turning the two pinching members constituting the clip member in opposite directions about the turning axis so as to mutually separate, and by separating the pin member from the clip member releases the fastening state of the fastening member.

In the fastening device according to the present invention, presupposing the aforementioned invention, the fastening member is provided with a pin member that is attached to the fastened members, and a clip member that holds the pin member, the clip member includes a notch portion in which the pin member, which is the moving portion, is attached, the pin member is held by an inside wall surface of the notch portion so as to be sandwiched from both sides, the driving member presses the pin member toward an outside of the notch portion of the clip member, and the fastening state of the fastening member is released by separating the pin member from the notch portion.

According to the fastening device of this constitution, the fastened members to which the pin member is attached are fixedly fastened by the clip member that pinches the pin member and a nut member that is attached to one end of the pin member. The driving member separates the pin member from the notch portion by pressing the pin member, which is attached to the notch portion of the clip member, to the outside, thereby releasing the fastening state of the fastening member.

In the fastening device according to the present invention, presupposing the aforementioned invention, the clip member includes a holding member that holds the driving member.

According to the fastening device of this constitution, the driving member is held at the clip member, whereby due to the restoring force when the shape memory alloy of the driving member reverts from the deformed shape to the memory shape, the two pinching members constituting the clip member are turned about the turning axis, and by pressing toward the outside the pin member, which is attached to the notch portion of the clip member, can release the fastening state of the fastening member.

In the fastening device according to the present invention, presupposing the aforementioned invention, the clip member includes a restriction member that restricts driving of the moving portion.

According to the fastening device of this constitution, when the shape memory alloy of the driving member held in the clip member reverts from the deformed shape to the memory shape, excessive turning of the two pinching members constituting the clip member, and excessive deformation of the moving member in the direction that presses the pin member, which is attached to the notch portion of the clip member, outward can be prevented.

In the fastening device according to the present invention, presupposing the aforementioned invention, the pin member includes either one of a mutually fitting concave portion and convex portion, and the clip member includes the other one of the concave portion and convex portion.

According to the fastening device of this constitution, when the pin member is held in the clip member, the pin member and the clip member are firmly fixed, and the desired fastening strength can be ensured by the fitting of either one of the concave portion and convex portion provided in the pin member and either one of the concave portion and convex portion provided in the clip member.

In the fastening device according to the present invention, presupposing the aforementioned invention, the driving member is formed of a shape memory alloy in a coil shape or a U-shape, and being deformed in the fastening state of the fastening member so that a distance between two predetermined positions of the shape memory alloy becomes closer than a distance in the memory shape.

According to the fastening device of this constitution, when the shape memory alloy of the driving member reverts from the deformed shape to the memory shape, the distance between the two predetermined positions of the shape memory alloy increases, whereby the driving force acts on the moving portion provided in the fastening member so that the fastening state of the fastening member is easily released. Moreover, since the driving member has a small cross-sectional area and is formed with a simple shape, resistance heating by directly energizing the driving member is possible, and so the fastening can be readily released while reducing the electrical energy required to raise the temperature of the driving member to the transformation point of the shape memory alloy or higher compared to the case of indirect heating using a heater or the like.

Advantageous Effects of the Invention

According to the fastening device of the present invention, providing the fastening device with the fastening member and the driving member can prevent the shapes of the members from becoming complicated compared to the case of, for example, integrating the fastening member and the driving member, and can improve the versatility of the fastening device. In addition, by forming the driving member, which is capable of releasing the fastening state of the fastening member, with a shape memory alloy, the fastening member may be formed of a suitable construction material that can ensure the desired fastening strength so that the fastened members can be fixedly fastened in a suitable manner.

Furthermore, according to the fastening device of the present invention, when the shape memory alloy of the driving member held in the clip member reverts from the deformed shape to the memory shape, excessive turning of the two pinching members constituting the clip member, and excessive deformation of the moving member in the direction that presses the pin member, which is attached to the notch portion of the clip member, outward can be prevented.

Furthermore, according to the fastening device of the present invention, the pin member and the clip member are firmly fixed, and the desired fastening strength can be ensured.

Furthermore, according to the fastening device of the present invention, the fastening state of the fastening member is easily released by the restoring force when the shape memory alloy of the driving member reverts from the deformed shape to the memory shape. In addition, since the driving member has a small cross-sectional area and is formed with a simple shape, resistance heating by directly energizing the driving member is possible, and so the fastening can be readily released while reducing the electrical energy required to raise the temperature of the driving member to the transformation point of the shape memory alloy or higher compared to the case of indirect heating using a heater or the like.

DESCRIPTION OF THE REFERENCE SYMBOLS

Figure 1:
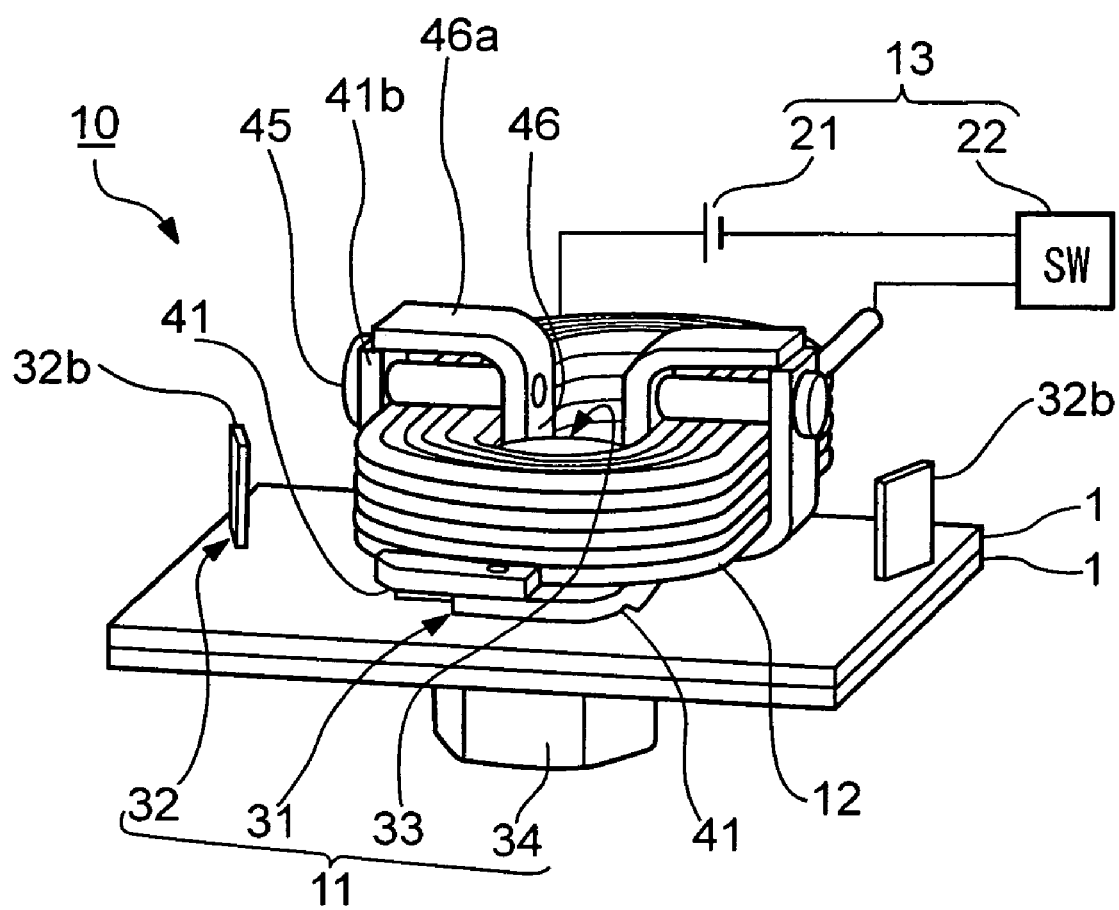
FIG. 1 is a perspective view of the fastening device according to the first embodiment of the present invention.

1: fastened member
10: fastening device
11: fastening member

12: driving member
13: energizing device
31: clip member
32: clip restriction member
33: pin member
33b: reduced diameter portion
41: clip pieces
41b: projection portion
46: holding members
61: pin holding member
61a: notch
61c: hook portion
63b: notch portion

BEST MODE FOR CARRYING OUT THE INVENTION

The first embodiment of the present invention is explained below, referring to the accompanying drawings.

A fastening device 10 according to the present embodiment is constituted, as shown for example in FIG. 1, by a fastening member 11 that fixedly fastens fastened members 1, a driving member 12 that is capable of releasing a fastened state of the fastening member 11, and an energizing device 13. For example, the driving member 12 is formed by shape memory alloy wire (for example, 1 mm in diameter) having an insulating coating and wound into a coil. The energizing device 13 connected to both end portions of the driving member 12 is constituted by a power supply 21 and a switch 22 that controls an ON/OFF of energization from the power supply 21 to the driving member 12.

Figure 2:
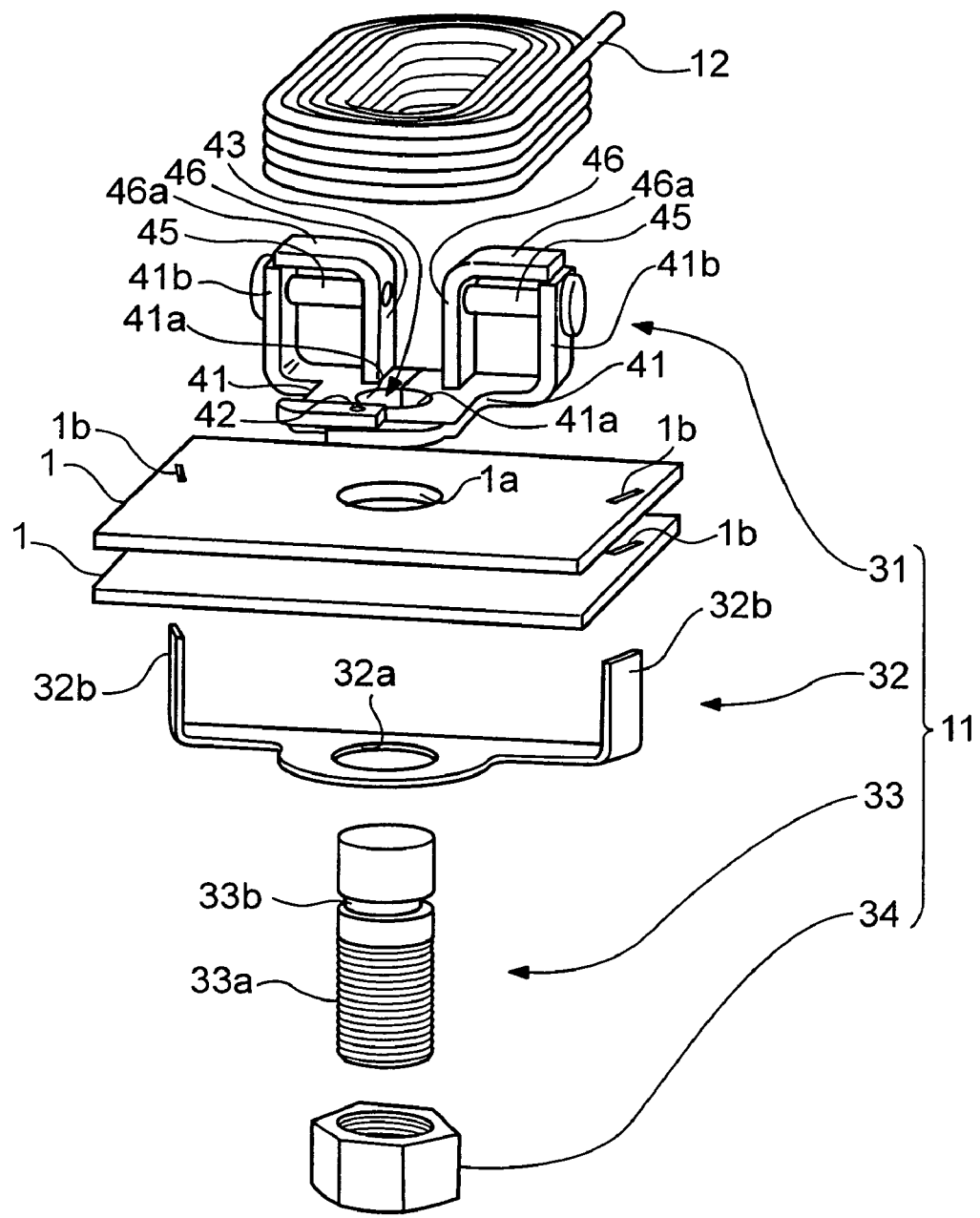
FIG. 2 is an exploded perspective view of the fastening device shown in FIG. 1.

The fastening member 11 is constituted, as shown for example in FIG. 2, by a clip member 31, a clip restriction member 32, a pin member 33, and a nut 34.

Figure 3:
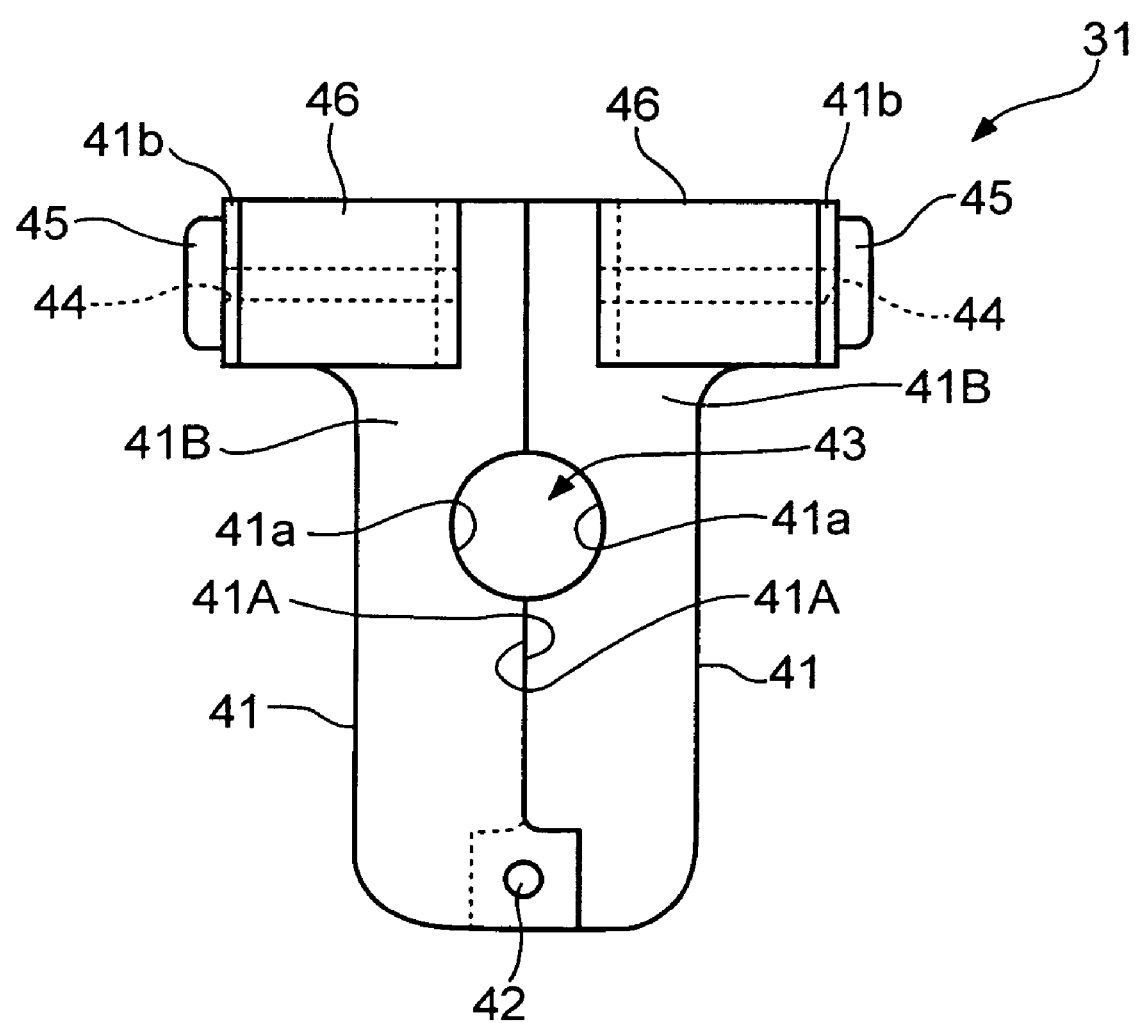
FIG. 3 is a plan view of the clip member shown in FIG. 1.

As for the clip member 31, as shown for example in FIG. 2 and FIG. 3, one end portions of two clip pieces 41 are turnably connected to each other via a pin 42, and abutting surfaces 41A thereof are formed to be abuttable when the other end portions of the two clip pieces 41 turn toward each other.

A notch portion 41a that is approximately semicircular in plan view is formed on the abutting surface 41A of each clip piece 41, so that a pin member mounting hole 43 that is circular in plan view is formed by the notch portions 41a when the abutting surfaces 41A of the two clip pieces 41 abut each other. The inner diameter of the pin member mounting hole 43 is formed to be a value that is slightly greater than an outer diameter of a reduced diameter portion 33b of the pin member 33 described below.

Also, a projection portion 41b that projects from the top of a surface 41B is formed on the other end portion of each clip piece 41. Each projection portion 41b of the two clip pieces 41 abuts the outer peripheral surface of the driving member 12 described below so as to sandwich the driving member 12 from both sides in the diameter direction. Furthermore, a bolt mounting hole 44 is formed in a distal end portion of each projection portion 41b, and a plate-shaped holding member 46 disposed at a position separated from the projection portion 44b by a predetermined distance is connected to a bolt 45 that is mounted in the bolt mounting hole 44. This holding member 46 abuts the inner peripheral surface of the driving member 12 described below, so that the driving member 12 is sandwiched from both sides in the diameter direction by the pair of holding members 46 and projection portions 41b.

A bend portion 46a that extends toward the projection portion 41b so as to cover the end portion of the driving member 12 mounted between the holding member 46 and the projection portion 41b is formed in the holding member 46.

An insertion hole 32a is formed in the center of the plate-shaped clip restriction member 32 for insertion of the pin member 33. Furthermore, the clip restriction member 32 is formed into an approximately U-shaped plate in which both end portions 32b bend so as to be perpendicular to the center portion. Both end portions 32b of the clip restriction member 32 abut the projection portions 41b when the other end portions of the two clip pieces 41 of the clip member 31 are separated from each other by a predetermined distance so as to restrict the turning of the two clip pieces 41.

As shown for example in FIG. 2, a thread portion 33a on which the nut 34 is mounted is formed on one end portion of the pin member 33, and a reduced diameter portion 33b having a diameter reduced by one step is formed at a position shifted from the other end toward the one end. The notch portion 41a of each clip piece 41 of the clip member 31 is mounted to the reduced diameter portion 33b.

Figure 4:
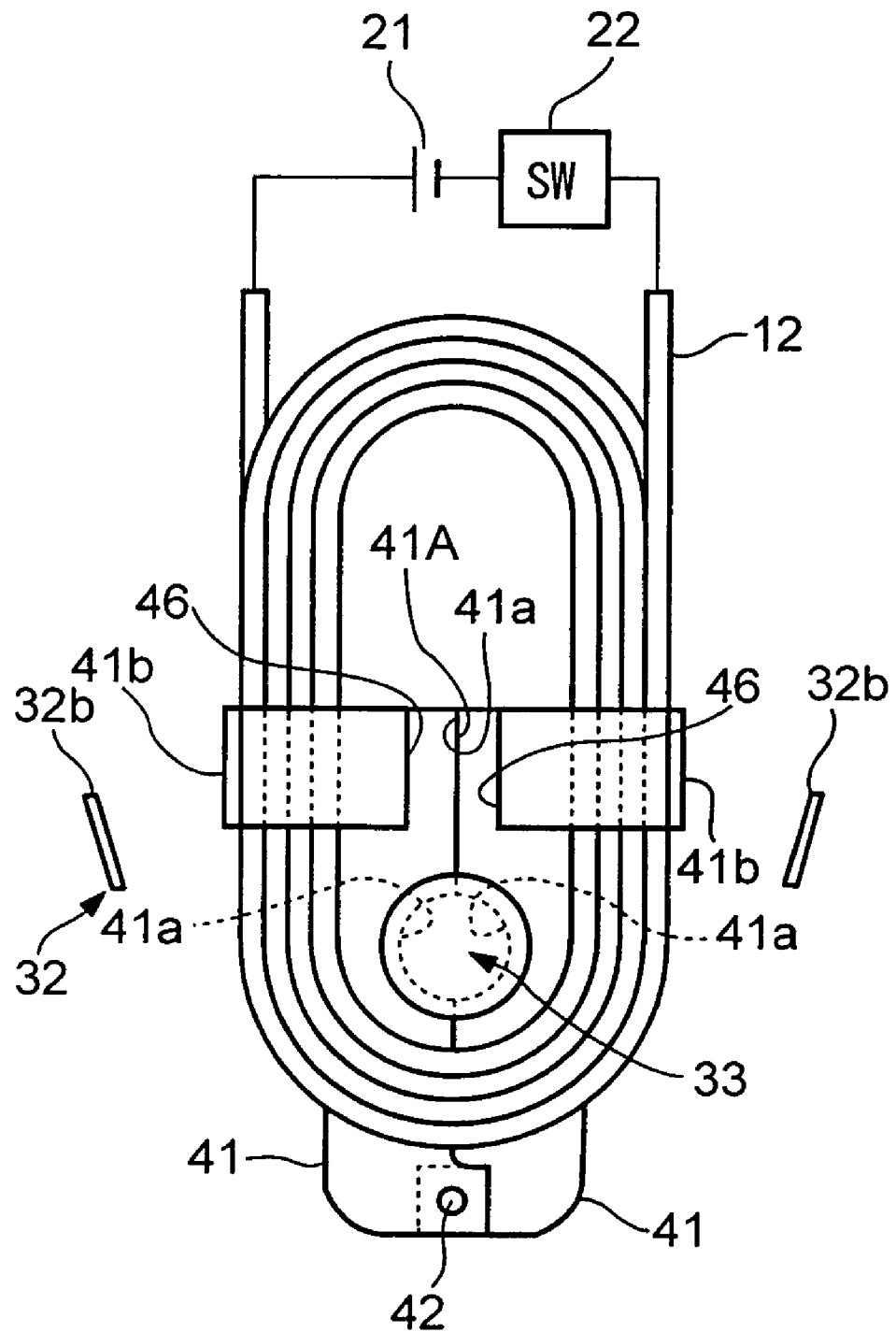
FIG. 4 is a plan view of the driving member attached to the clip member shown in FIG. 1.
Figure 5:
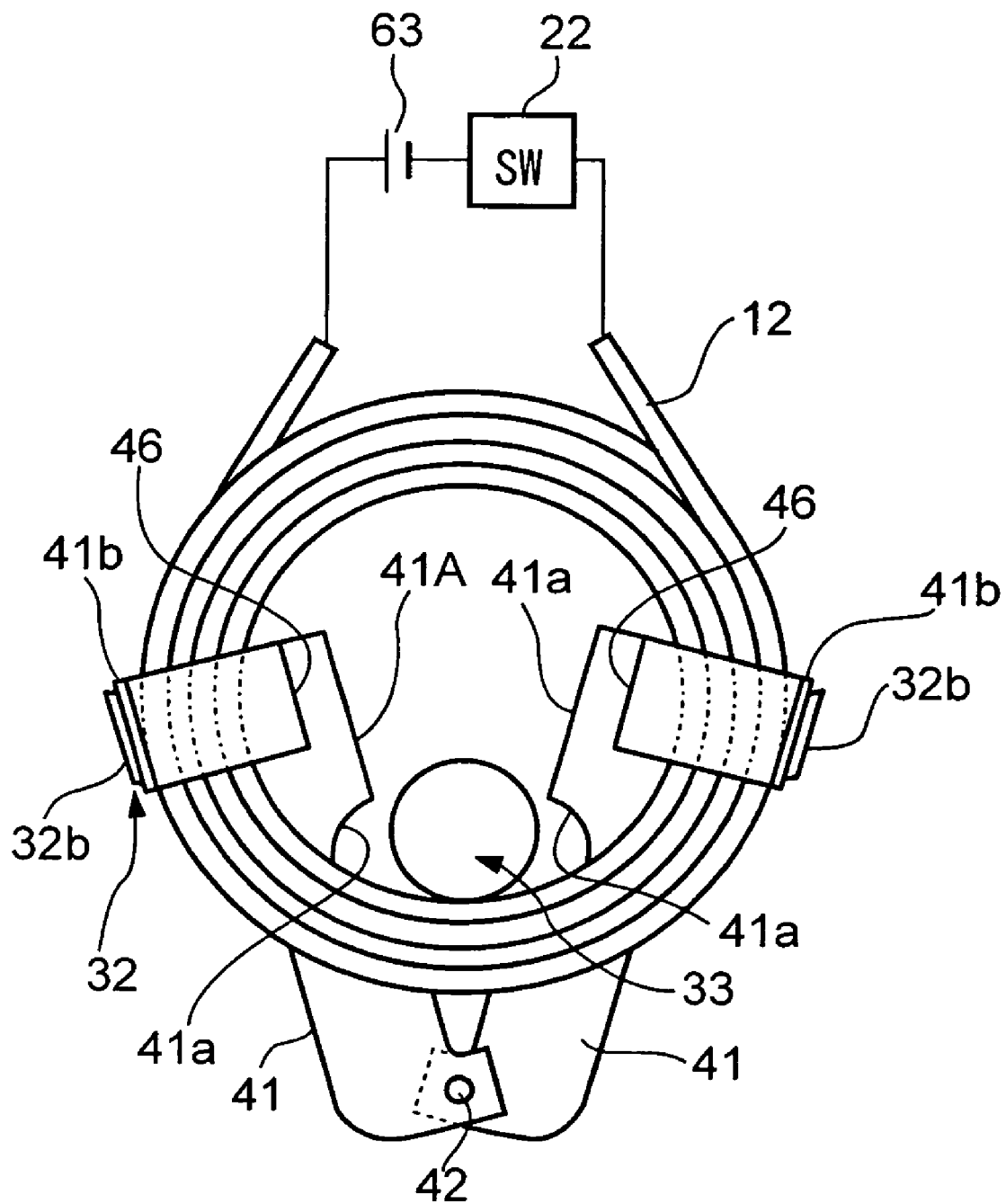
FIG. 5 is a plan view of the driving member attached to the clip member shown in FIG. 1.

As shown for example in FIG. 4, the deformed shape of the driving member 12, which constituted of a coil made from a shape memory alloy, is an oblong coil, while the memory shape thereof is a circular coil as shown for example in FIG. 5. When a temperature of the driving member 12 is less then a predetermined temperature, the driving member 12 assumes the deformed shape, and when the temperature of the driving member 12 is the predetermined temperature or higher, the driving member 12 reverts from the deformed shape to the memory shape.

In the clip member 31 on which the driving member 12 is mounted, as described below, the abutting surfaces 41A of the two clip pieces 41 abut each other when the driving member 12 is in a deformed state, and when the driving member 12 reverts from the deformed shape to the memory shape, the other end portions of the two clip pieces 41 turn so as to separate from each other.

As shown for example in FIG. 2, each pin member insertion-hole 1a in which the pin member 33 is inserted and through-holes 1b in which both end portions 32b of the clip restriction member 32 are inserted are formed in the plate-shaped fastened members 1. In a state of both end portions 32b of the clip restriction member 32 being inserted in the through-holes 1b of the fastened members 1, each pin member insertion-hole 1a of the fastened members 1 is disposed to be coaxial with the insertion hole 32a of the clip restriction member 32, and the pin member insertion-holes 1a are formed to be continuous while facing the insertion hole 32a.

The fastening device 10 according to the present embodiment has the aforementioned constitution. Next, the step of fixedly fastening the fastened member 1 with the fastening device 10 and the step of releasing the fastening will be explained.

When fixedly fastening the fastened members 1, at first, the both end portions 32b of the clip restriction member 32 are inserted in the through-holes 1b of the fastened members 1, and the pin member insertion-hole 1a of the fastened members 1 and the insertion hole 32a of the clip restriction member 32 are made continuous.

Then, the pin member 33 is inserted in each pin member insertion-hole 1a of the fastened members 1 and the insertion hole 32a of the clip restriction member 32, and the reduced diameter portion 33b of the other end portion of the pin member 34, as well as both end portions 32b of the clip restriction member 32, are made to protrude from the surface of the fastened members 1.

Next, the driving member 12 is mounted on the fastening member 11, and in the state of energization of the driving member 12 from the energizing device 13 being set to OFF, the notch portion 41a of each clip piece 41 is mounted on the reduced diameter portion 33b of the pin member 33 so that the reduced diameter portion 33b of the pin member 33 is pinched from both sides by the notch portions 41a of the two clip pieces 41 of the driving member 12, while deforming the driving member 12 to a suitable shape by a suitable external force.

Here, the driving member 12 mounted on the fastening member 11 has an approximately circular shape, and when the driving member 12 is in its memory shape, the two clip pieces 41 of the fastening member 11 are set so that the other end portions thereof separate from each other. By deforming the driving member 12 so that the other end portions of the two clip pieces 41 approach each other, the driving member 12 deforms from the circular memory shape to the oblong deformation shape. The reduced diameter portion 33b of the pin member 33 is mounted in the pin member mounting hole 43 formed by the notch portions 41a by the abutting of the abutting surfaces 41A of the two clip pieces 41, and so relative displacement of the pin member 33 and the fastening member 11 is restricted along the axial direction of the pin member 33.

Figure 6:
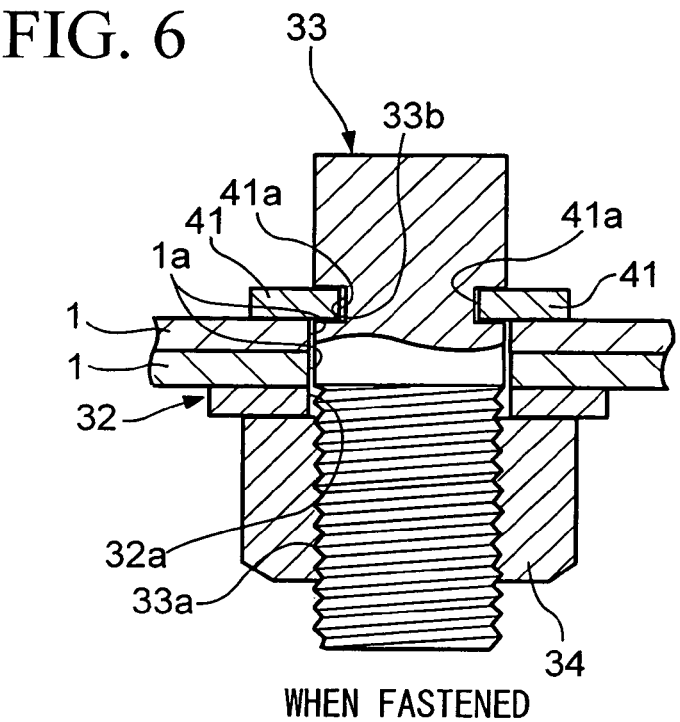
FIG. 6 is a sectional side view of the fastening device shown in FIG. 1.

As shown for example in FIG. 6, the fastened members 1 are fixedly fastened by attaching the nut 34 to the thread portion 33a at the one end portion of the pin member 33 that protrudes from the surface of the clip restriction member 32.

Figure 7:
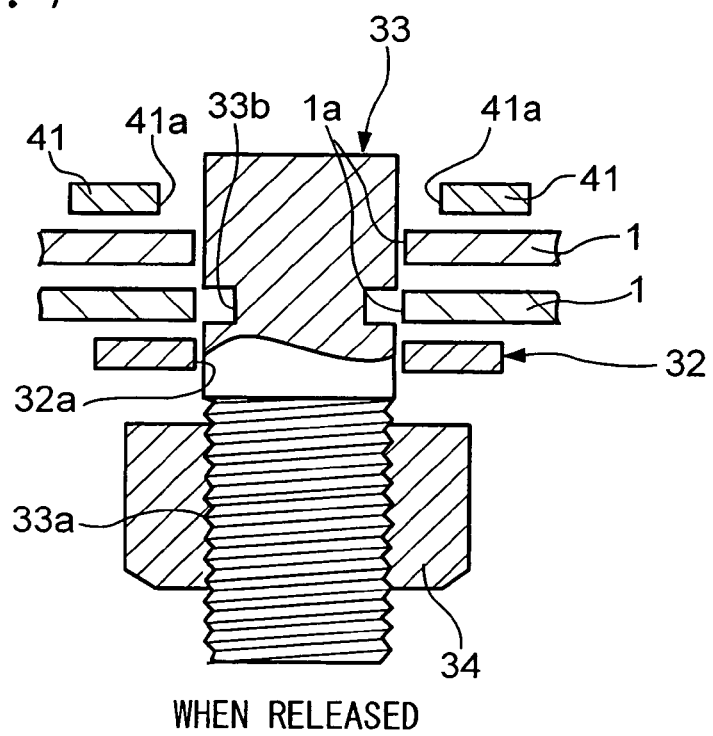
FIG. 7 is a sectional side view of the fastening device shown in FIG. 1.

When releasing the fastening of the fastened members 1, the switch 22 of the energizing device 13 is set to ON to start energization from the energizing device 13 to the driving member 12. The energization causes the temperature of the driving member 12 to rise. When the temperature reaches a temperature equal to or greater than the transformation point of the shape memory alloy, a restoring force occurs that causes the driving member 12 to revert from the deformed shape to the memory shape. Due to this restoring force, the other end portions of the two clip pieces 41 of the fastening member 11 turn so as to separate from each other. As shown for example in FIG. 7, the notch portion 41a of each clip piece 41 detaches from the reduced diameter portion 33b of the pin member 33, whereby the fastening of the fastened members 1 is released.

At this time, when the other end portions of the two clip pieces 41 separate from each other by a predetermined distance, as shown for example in FIG. 5, the projection portion 41b of each clip piece 41 abuts both end portions 32b of the clip restriction member 32, and so excessive turning of the two clip pieces 41 is restricted.

As stated above, according to the fastening device 10 of the present embodiment, the fastening device 10 is constituted by the fastening member 11 and the driving member 12, separable each other. This can prevent complication of the shapes of the members 11 and 12 compared to the case of integrally forming the fastening member 11 and the driving member 12 and can improve the versatility of the fastening device 10. In addition, since the driving member 12, which is capable of releasing the fastening state of the fastening member 11, is formed of a shape memory alloy, the fastening member 11 may be formed of a suitable construction material that can ensure the desired fastening strength so that the fastened members 1 can be fixedly fastened in a suitable manner.

Furthermore, forming the driving member 12 in a coil with a simple shape can prevent an excessive increase in the electrical energy required when raising the temperature by resistance heating. Also, by altering the number of windings of the coil or the diameter of the coil, the magnitude of the restoring force when reverting from the deformed shape to the memory shape can be readily altered, and so the fastening strength and the driving force required for fastening release can be flexibly set in accordance with the place of application of the fastening device 10 and the fastened members 1.

Furthermore, providing the clip restriction member 32 can prevent excessive turning of the two clip pieces 41 when the shape memory alloy of the driving member 12 that is mounted in the fastening member 11 reverts from the deformed shape to the memory shape.

In the above-described embodiment, the driving member 12 was formed with a shaped memory alloy having a coil-shaped, but it is not limited thereto. For example, it may be formed with a shape memory alloy having a suitable shape such as a U-shape.

Figure 8:
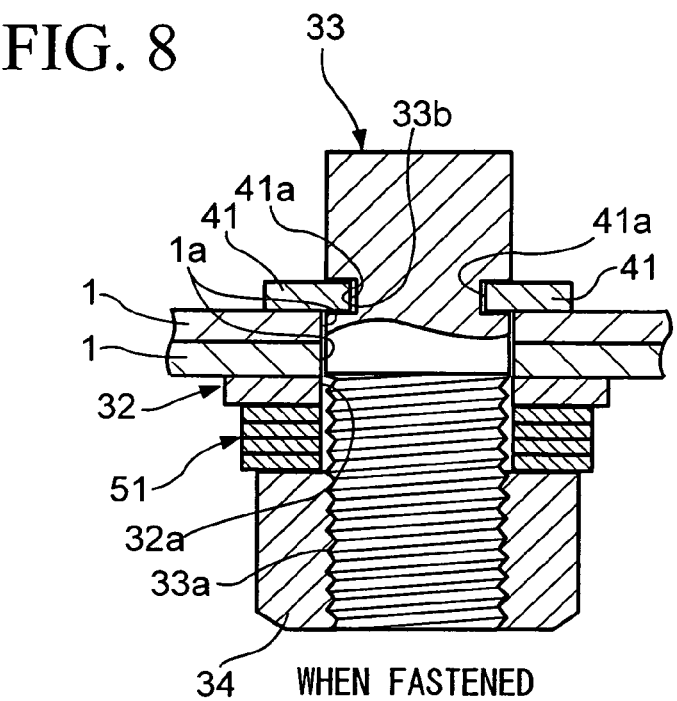
FIG. 8 is a sectional side view of the fastening device according to a modification example of the present embodiment.
Figure 9:
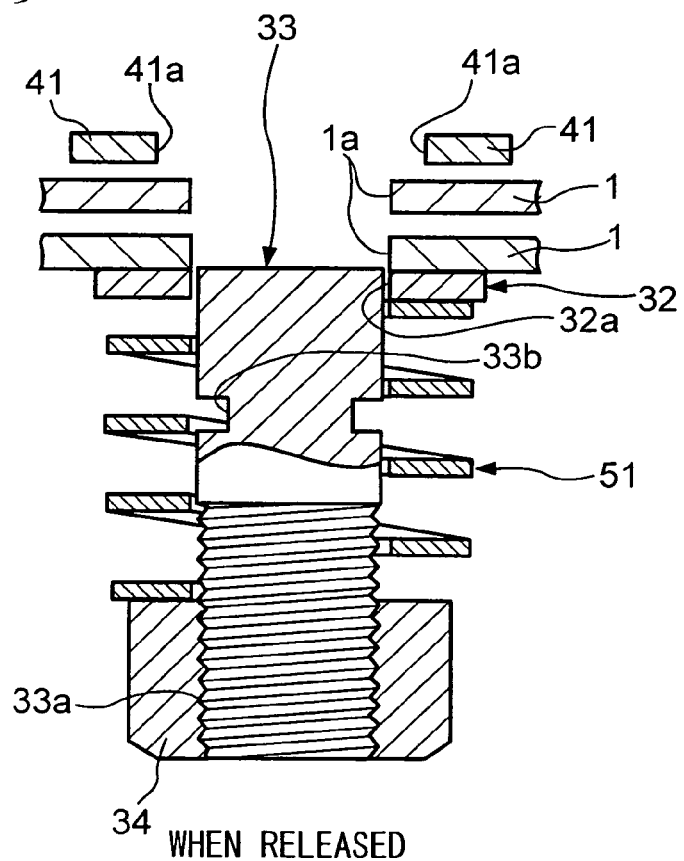
FIG. 9 is a sectional side view of the fastening device according to a modification example of the present embodiment.

In addition, as shown for example in FIG. 8 and FIG. 9, a spring 51 such as a belleville spring that applies a counter-force along the axial direction of the pin member 33 may be provided between the clip restriction member 32 and the nut 34. In this case, when the notch portion 41a of each clip piece 41 detaches from the reduced diameter portion 33b of the pin member 33, the pin member 33 can be readily pulled out from the fastened members 1.

The second embodiment of the present invention is explained below, referring to the accompanying drawings.

The fastening device 10 according to this embodiment is constituted by the fastening member 11 that fixedly fastens fastened members 1, the driving member 12 that is capable of releasing the fastened state of the fastening member 11, and the energizing device 13, as shown for example in FIG. 10A, FIG. 10B, FIG. 11A and FIG. 11B. For example, the driving member 12 is formed by shape memory alloy wire (for example, 1 mm in diameter) having an insulating coating and wound into a coil. The energizing device 13 connected to both end portions of the driving member 12 is constituted by a power supply 21 and a switch 22 that controls the ON/OFF of energization from the power supply 21 to the driving member 12.

The fastening member 11 is constituted by a pin holding member 61, a washer 62, a pin member 63, and a nut 64.

A notch portion 61a is formed in one end portion of the plate-shaped pin holding member 61, and a hook portion 61c that is bent into a hook-shaped is formed at the other end portion. The driving member 12 is mounted in this hook portion 61c. The inner wall face of the notch portion 61a is provided with a shape that follows a peripheral surface of the notch portion 63b of the pin member 63 described below, with the notch portion 63b of the pin member 63 being mounted thereon.

A thread portion (not illustrated) on which the nut 64 is mounted is formed on one end portion of the pin member 64, and a concave portion 63a having a shape that follows the outer periphery of the driving member 12 is formed on the other end portion. In addition, the notch portion 63b is formed at a position shifted from the concave portion 63a toward the one end portion.

Figure 10A:
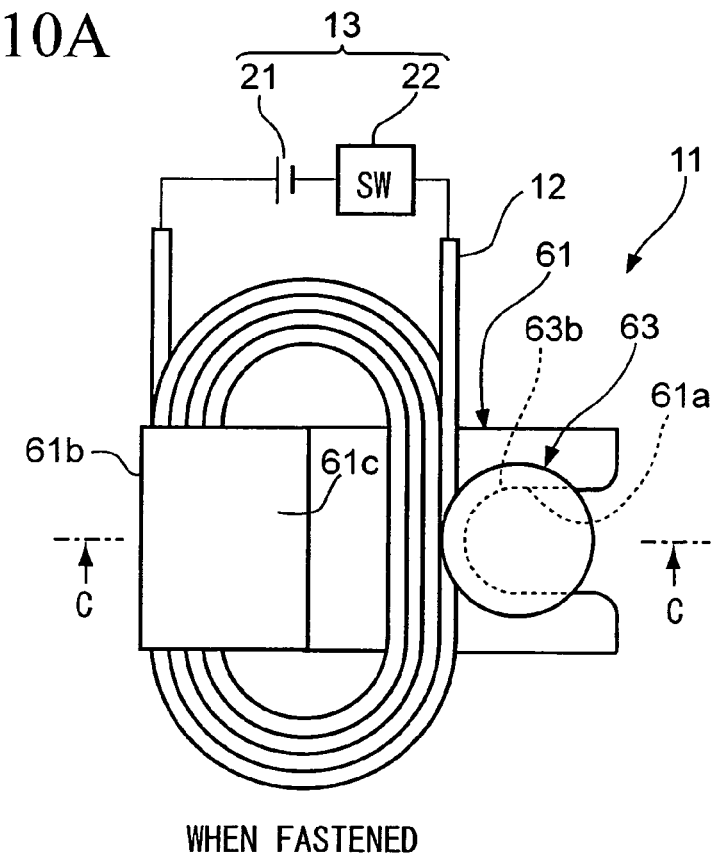
FIG. 10A is a plan view of the fastening device according to the second embodiment of the present invention.
Figure 11A:
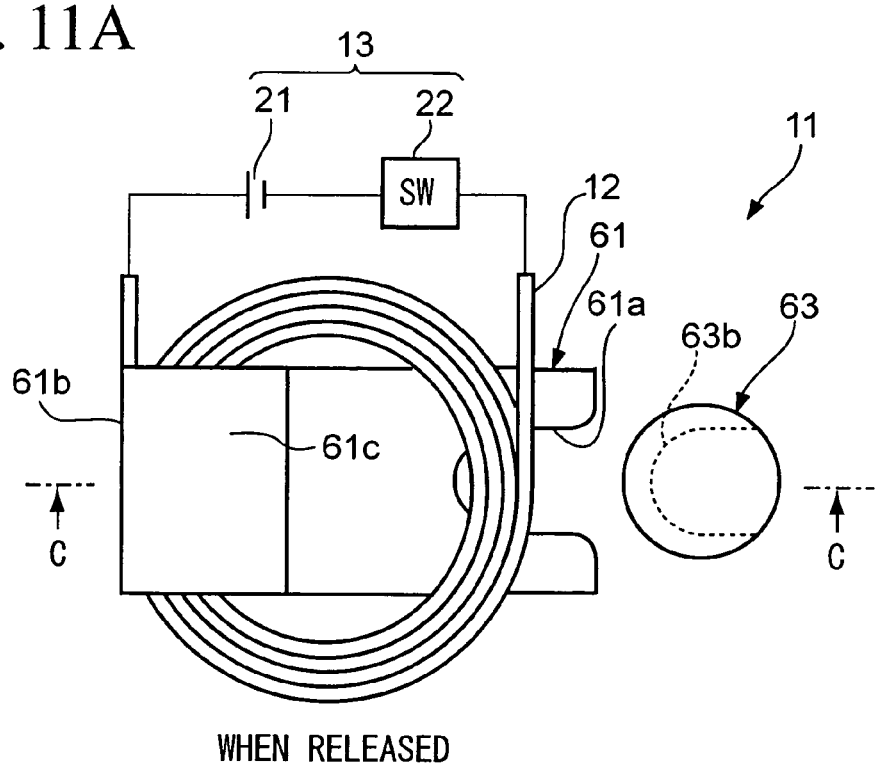
FIG. 11A is a plan view of the fastening device according to the second embodiment of the present invention.
Figure 11B:
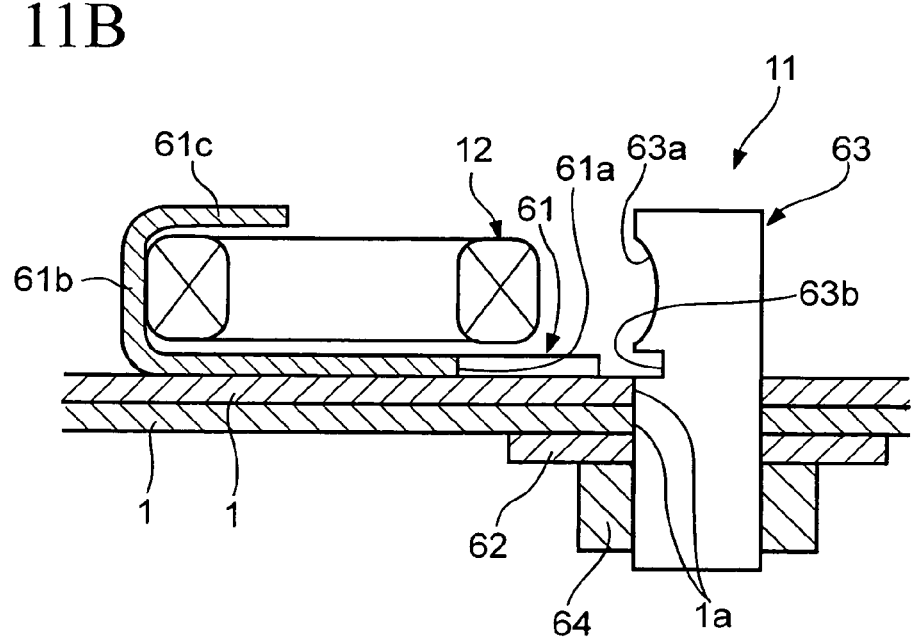
FIG. 11B is a sectional view along the line C-C shown in FIG. 11A.

As shown for example in FIG. 10A, a deformed shape of the driving member 12, which is constituted by a coil made from a shape memory alloy, is an oblong coil, while a memory shape thereof, as shown for example in FIG. 11A, is a circular coil. When a temperature of the driving member 12 is less then a predetermined temperature, the driving member 12 assumes the deformed shape, and when the temperature of the driving member 12 is the predetermined temperature or higher, the driving member 12 reverts from the deformed shape to the memory shape.

The outer circumference side end portion of the driving member 12 that is mounted in the pin holding member 61, during a deformed state, is disposed at a position shifted more the other end portion side of the pin holding member 61 than a base of the notch portion 61a of the pin holding member 61. When the driving member 12 reverts from the deformed state to a memory state, the outer circumference side end portion of the driving member 12 moves to a position shifted more to the one end portion side of the pin holding member 61 than the base of the notch portion 61a of the pin holding member 61.

When fixedly fastening the fastened members 1 by the fastening device 10 according to the second embodiment, first the notch portion 63b of the pin member 63 is mounted in the notch portion 61a of the pin holding member 61. Thereby, relative displacement of the pin holding member 61 and the pin member 63 is restricted along an axial direction of the pin member 63.

At this time, in a state of energization of the driving member 12 from the energizing device 13 being set to OFF, the outer circumference side end portion of the driving member 12 is pressed inward in a diameter direction by the concave portion 63a of the pin member 63. Thereby, the driving member 12 is made to deform from the circular shape that is the memory shape to the oblong shape that is the deformed shape.

Figure 10B:
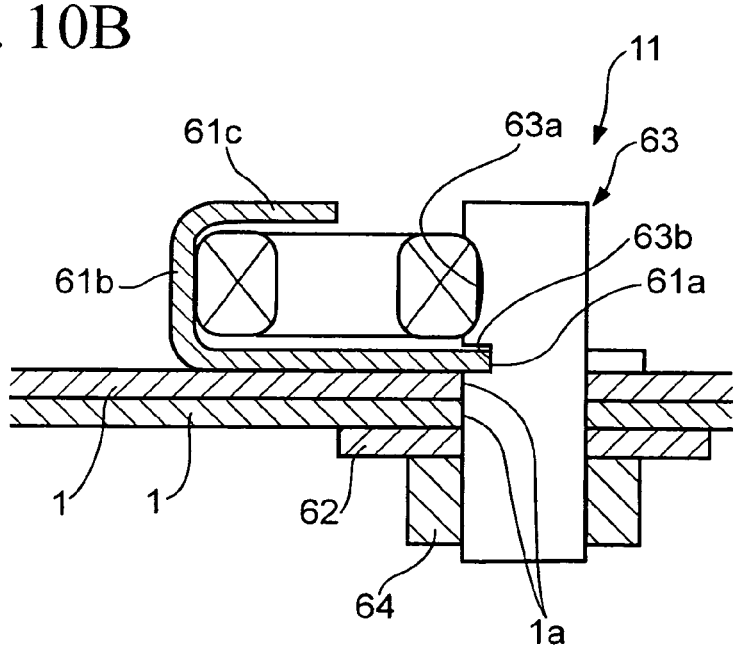
FIG. 10B is a sectional view along the line C-C shown in FIG. 10A.

As shown for example in FIG. 10B, by mounting a washer 62 and the nut 64 on the pin member 63 that projects from the surface of the fastened members 1, the fastened members 1 are fixedly fastened.

On the other hand, when releasing the fastening of the fastened member 1, the switch 22 of the energizing device 13 is set to ON to start energization from the energizing device 13 to the driving member 12. The energization causes the temperature of the driving member 12 to rise. When the temperature reaches a temperature equal to or greater than the transformation point of the shape memory alloy, a restoring force occurs that causes the driving member 12 to revert from the deformed shape to the memory shape. Due to this restoring force, the pin member 63 mounted in the notch portion 61a of the pin holding member 61 is pressed toward an outside of the notch portion 61a. Then, as shown for example in FIGS. 11A and 11B, the notch portion 63b of the pin member 33 detaches from the notch portion 61a of the pin holding member 61, whereby the fastening of the fastened members 1 is released.

While preferred embodiments of the invention have been described and illustrated above, it should be understood that the present invention is not limited to these embodiments and can be widely applied. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

The present invention can be appropriately used for example when fastened members to be fastened which are required to be regularly fastened in a firm manner and quickly released during emergencies.

The invention claimed is:

1. A fastening device comprising:
   a fastening member that fixedly fastens fastened members; and
   a driving member configured to release a fastening state of the fastening member by applying a driving force to a moving portion provided in the fastening member to drive the moving portion either coaxially or orthogonally relative to a longitudinal axis of the fastening member,
   wherein the driving member is formed of a shape memory alloy having a coil shape, is deformed in the fastening state of the fastening member, and the driving force is a restoring force of the shape memory alloy, and
   wherein the deformed shape of the driving member is an oblong coil while the memory shape thereof is a circular coil so that in the fastening state a distance between-two predetermined positions of the coil shape becomes closer than a distance in the memory shape.

2. The fastening device according to claim 1, further comprising an energizing means that energizes the driving member, wherein the driving member is reverted to the memory shape by being energized by the energizing means.

3. The fastening device according to claim 1, wherein the fastening member includes a pin member that is attached to the fastened members, and a clip member that holds the pin member,
   the clip member includes two pinching members formed as the moving portion to be turnable about a turning axis, with the pin member being held so as to be pinched from both sides by the two pinching members, and
   the driving member releases the fastening state of the fastening member by turning the pinching members of the clip member about the turning axis.

4. The fastening device according to claim 1, wherein
   the fastening member includes a pin member that is attached to the fastened members, and a clip member that holds the pin member,
   the clip member includes a notch portion in which the pin member, which is the moving portion, is attached,
   the pin member is held by an inside wall surface of the notch portion so as to be sandwiched from both sides,
   the driving member presses the pin member toward an outside of the notch portion of the clip member, and the fastening state of the fastening member is released by separating the pin member from the notch portion.

5. The fastening device according to claim 3, wherein the clip member includes a holding member that holds the driving member.

6. The fastening device according to claim 5, wherein the clip member includes a restriction member that restricts driving of the moving portion.

7. The fastening device according to claim 3, wherein
   the pin member includes either one of a mutually fitting concave portion and convex portion, and
   the clip member includes the other one of the concave portion and convex portion.

8. The fastening device according to claim 1, wherein
   the driving member is formed of a shape memory alloy in a coil shape or a U-shape, and being deformed in the fastening state of the fastening member so that a distance between two predetermined positions of the shape memory alloy becomes closer than a distance in the memory shape.

* * * * *

UNITED STATES PATENT AND TRADEMARK OFFICE
CERTIFICATE OF CORRECTION

PATENT NO. : 7,753,632 B2
APPLICATION NO. : 11/547563
DATED : July 13, 2010
INVENTOR(S) : Tadashi Naitou et al.

It is certified that error appears in the above-identified patent and that said Letters Patent is hereby corrected as shown below:

Please Insert Col. 1 lines 8-10 after TECHNICAL FIELD as follows:

--This application is a National Stage entry on International Application No. PCT/JP2005/006656, filed on April 5, 2005, which claims priority to Japanese Patent Application 2004-113231, filed April 7, 2004, the content of which is incorporated herein by reference.--

Signed and Sealed this

Twelfth Day of October, 2010

David J. Kappos
*Director of the United States Patent and Trademark Office*